No. 845,392. PATENTED FEB. 26, 1907.
L. R. BLACKMER.
CENTERING DEVICE FOR DRAIN OR SIMILAR PIPES.
APPLICATION FILED MAR. 2, 1906.
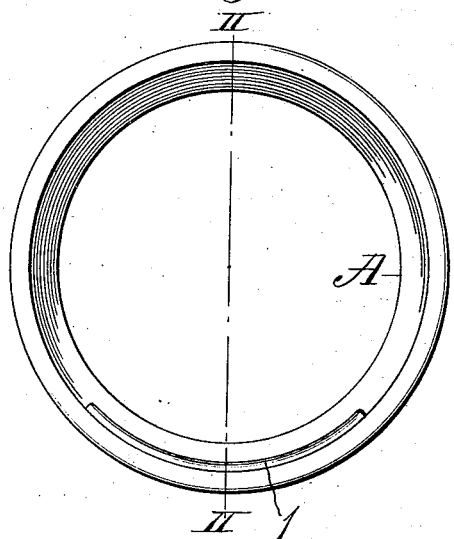
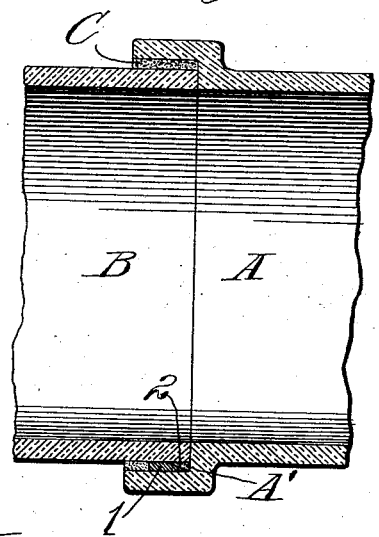
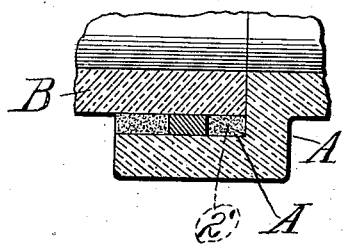
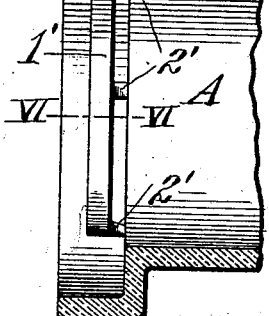
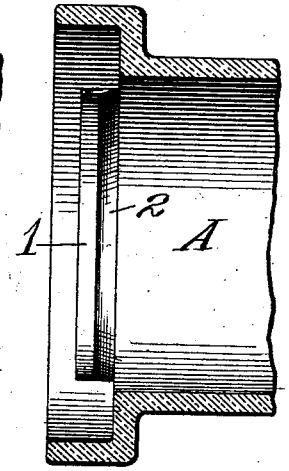
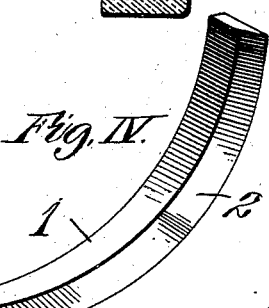
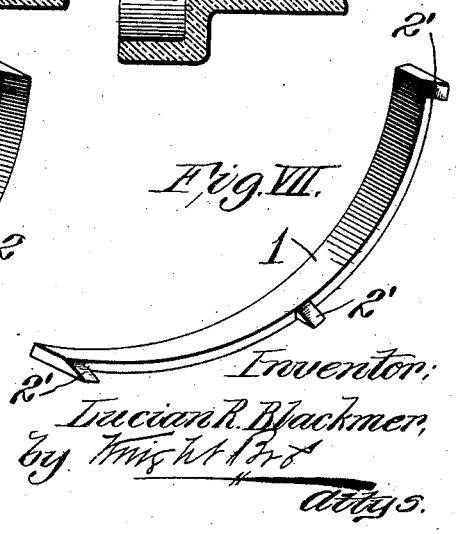

UNITED STATES PATENT OFFICE.

LUCIAN R. BLACKMER, OF WEBSTER GROVES, MISSOURI, ASSIGNOR TO BLACKMER & POST PIPE COMPANY, OF ST. LOUIS, MISSOURI, A CORPORATION.

CENTERING DEVICE FOR DRAIN OR SIMILAR PIPES.

No. 845,392. Specification of Letters Patent. Patented Feb. 26, 1907.

Application filed March 2, 1906. Serial No. 303,771.

*To all whom it may concern:*

Be it known that I, LUCIAN R. BLACKMER, a citizen of the United States, residing in Webster Groves, in the county of St. Louis, in the State of Missouri, have invented certain new and useful Improvements in Centering Devices for Drain or Similar Pipes, of which the following is a full, clear, and exact description, reference being had to the accompanying drawings, forming part of this specification.

My invention relates to a device whereby the adjacent ends of that class of pipe-sections having spigot and socket ends may be properly centered with respect to each other, thereby providing for the proper registration or alinement of the conduit composed of such sections.

Figure I is an end elevation of a section of pipe looking at the socket end thereof and illustrating my centering device in position. Fig. II is a vertical longitudinal section taken through two joined ends of pipe-sections with my device shown in position and the joint-sealing cement in place in the joint. Fig. III is a horizontal section of the socket end of a pipe with my centering device shown in the bell or socket portion of the section. Fig. IV is a perspective view of my device. Fig. V is a similar view to Fig. III, showing a modified form of my device in position in the pipe-section. Fig. VI is a longitudinal vertical section taken approximately on line VI VI, Fig. V, with the sealing-cement shown in position in the joint between the pipe-section shown in Fig. V and a mating section. Fig. VII is a perspective view of the modified form of device.

A (see Figs. I to III, inclusive) designates the socket end of a pipe-section, and B (see Fig. II) is the spigot end of a mating section that is adapted to fit within the socket A. The pipe ends A and B are adapted to be fitted together in the usual manner and the joint between them is adapted to be sealed in water-tight manner by the introduction of a layer C of cement interposed between the socket of one section and the spigot end of the other section, as seen in Fig. II.

1 designates a segment-shaped centering-strip, that may be of metal or any other suitable hard material and which is intended to be so formed that it will correspond in contour to a segment of the pipe-section socket and spigot end between which said strip is adapted to be located. The centering-strip 1 is preferably provided with a tapered edge 2, extending longitudinally thereof and located at the inner side of the arc of the strip, as seen most clearly in Figs. III and IV.

In laying pipes of the character herein described and in connection with which my centering device is used the centering-strip is laid in the socket of each pipe-section at the bottom thereof, and when the spigot ends of the mating pipe-sections are introduced into the pipe-sections that receive them said spigot ends are supported in proper registration with the pipe-sections to which they are fitted, due to the resting of said spigot ends upon the centering-strips. The layer of sealing-cement is introduced into the space surrounding the spigot end of the pipe-section of each mating pair of sections at the proper time, thereby closing said spaces to make the joints of the sections water-tight.

The centering-strips are preferably tapered, as shown at 2, for the purpose of permitting the strips to be laid in the sockets of the pipe-sections with a thin edge resting against the base-face of the pipe-section socket, as seen in Figs. II and III, whereby pockets, as seen at A', Fig. II, are produced adjacent to the joint-lines of the pipe-section ends to receive a body of cement that effectually seals the space between the directly-abutting ends of the pipe-sections and obviates the escape of water into the portion of the joint-space between the socket and spigot ends of the pipe-sections. It is obvious that where the centering-strip is made with a tapering edge, as explained, sealing-cement should be laid into the pocket A' previous to the assemblage of the mating ends of the pipe-sections in order that said pocket may be completely filled, but that the remainder of the space between the pipe-section ends may be filled with sealing-cement after the pipe-sections have been assembled.

In Figs. V to VII, inclusive, I have shown a modification of my centering-strip. In this modification the strip has a main body 1' of segment shape, and projecting from one of the edges of said body is a plurality of fingers 2', preferably of tapering form, but spaced apart from each other. In the use of this modified strip it is laid in the socket of each pipe-section in the same manner as the strip 1, so that the fingers of the strip are presented to the bases of the pipe-section sockets, as seen in Figs. V and VI, in order to furnish pockets, as seen at A'', Fig. VI, within which the sealing-cement is laid adjacent to the abutting end portions of the pipe-sections.

I claim—

1. As a new article of manufacture a centering device for drain or similar pipes consisting of a segment-shaped strip having its inner surface curved in an arc throughout its length.

2. As a new article of manufacture a centering device for drain or similar pipes consisting of a segment-shaped strip having both its inner and outer surface curved in an arc and having a beveled edge.

3. A centering-strip for drain or similar pipes consisting of a segment-shaped strip having a tapering edge at the inner side of the arc of said strip.

4. As a new article of manufacture a centering device for drain or similar pipes consisting of a longitudinally-curved strip.

5. As a new article of manufacture a centering device for drain or similar pipes consisting of a longitudinally-curved strip having a beveled longitudinal edge.

LUCIAN R. BLACKMER.

Witnesses:
C. A. DOOLITTLE,
W. I. CROWELL